United States Patent
Banks et al.

(10) Patent No.: US 8,019,847 B2
(45) Date of Patent: Sep. 13, 2011

(54) TOPIC BASED LOOP DETECTION IN A PUBLISH/SUBSCRIBE NETWORK

(75) Inventors: Andrew D. Banks, Hampshire (GB); Gavin Beardall, Alresford (GB); Adrian D. Dick, Southampton (GB); Ian C. Vanstone, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/119,849

(22) Filed: May 13, 2008

(65) Prior Publication Data
US 2009/0287804 A1    Nov. 19, 2009

(51) Int. Cl.
*G06F 15/16* (2006.01)

(52) U.S. Cl. ........ 709/223; 709/220; 709/222; 709/224; 715/202; 715/203

(58) Field of Classification Search .................. 709/223, 709/224, 226
See application file for complete search history.

(56) References Cited

U.S. PATENT DOCUMENTS

| | | | |
|---|---|---|---|
| 5,321,812 A | 6/1994 | Benedict et al. | |
| 6,230,198 B1 | 5/2001 | Dawson et al. | |
| 6,377,975 B1 * | 4/2002 | Florman | 709/203 |
| 7,453,812 B1 * | 11/2008 | Hobson et al. | 370/238 |
| 7,539,154 B1 * | 5/2009 | MacKay et al. | 370/256 |
| 2003/0101235 A1 * | 5/2003 | Zhang | 709/218 |
| 2004/0088369 A1 * | 5/2004 | Yeager et al. | 709/217 |
| 2006/0265397 A1 * | 11/2006 | Bryan et al. | 707/10 |
| 2007/0159987 A1 * | 7/2007 | Khan et al. | 370/256 |
| 2008/0209564 A1 * | 8/2008 | Gayde et al. | 726/25 |
| 2008/0294794 A1 * | 11/2008 | Darugar et al. | 709/238 |

OTHER PUBLICATIONS

"On Accurate Automatic Verification of Publish-Subscribe Architectures"—Luciano Baresi, Carlo Ghezzi, and Luca Mottola, Department of Electronics and Information, vol. 32; http://www.sics.se/-luca/papers/baresi07accurate.pdf.*
NPL document "Optimizing Publish/Subscribe Systems with Congestion Handling"—Somaya Arianfar, Helsinki University of Technology, Jun. 2008; http://nordsecmob.tkk.fi/Thesisworks/Arianfar.pdf.*

* cited by examiner

*Primary Examiner* — Krista M Zele
*Assistant Examiner* — Randy Scott
(74) *Attorney, Agent, or Firm* — Scully, Scott, Murphy & Presser, P.C.; Jeanine Ray, Esq.

(57) ABSTRACT

When a new broker is connected to a network, a loop detection message is sent over the new connection created by the new broker. The loop detection message includes topics. At each receiving broker, topics that cannot be propagated to a neighbor broker are removed. If the loop detect message contains no topics, the loop detect message is not propagated further. If the loop detection message returns to the new broker, a loop is detected.

18 Claims, 7 Drawing Sheets

TOPIC BASED LOOP DETECTION IN A PUBLISH/SUBSCRIBE NETWORK

BACKGROUND OF THE INVENTION

1. Field of the Invention

The present invention relates generally to loop detection in publish and subscribe (pub/sub) networks and like message-passing networks. More particularly, the present invention relates to topic-based loop detection in publish/subscribe networks.

2. Description of the Prior Art

In a publish/subscribe network, any number of consumers (e.g., computers; clients) can receive messages that are provided by one or more producers (e.g., computers; servers). In this case, a producer is called a publisher and a consumer is called a subscriber.

A publish/subscribe network operates based on a topic on which any number of interested consumers can subscribe in order to register their interest. This is similar to the way that a person might subscribe only to magazines about topics in which they are interested. Each topic provides particular event or state information. A topic is also a sub-section of a topic space (i.e., a composition of a hierarchy of topics), which is specifically marked as able to forward publications and subscriptions from producers to consumers.

A publisher can send messages (e.g., publications) containing information about a particular topic to all subscribers to that topic, without any knowledge of how many subscribers there are, or the details of the nodes that host those subscribers. In this way, publish/subscribe network completely decouples the provider of the information from the consumer of that information.

In order to facilitate this publish/subscribe network, a broker is required to hold information about which subscribers have subscribed to which topics and how to deliver messages to them. A publisher can then publish messages using the broker to all subscribers on that topic without knowing the details of those subscribers. There can be multiple publishers for a particular topic, and a subscriber to information about one topic can also be a publisher of information about other topics.

The broker is a component to which client applications connect to perform publish and subscribe messages in the publish/subscribe network. The broker handles the matching of publications with subscriptions, the distribution of publications to subscribing applications, and the persistence of messages to ensure a message delivery at the quality of service required. The broker acts as a hub for routing messages between publishers and subscribers. The broker can store messages on behalf of a client (i.e., a publisher or a subscriber) that is not connected and make them available to the client when it reconnects. Therefore, a broker can be understood as a data processing system in a publish/subscribe network. Brokers are connected to the publish/subscribe network as nodes.

When constructing a network of connected pub/sub (publisher/subscriber) brokers, it is essential that publications do not enter a loop (i.e., a closed circuit of links between brokers). Therefore, necessary mechanisms need to be implemented to prevent any one publication from looping indefinitely. Without any form of loop detection, publications can perpetually loop through a set of pub/sub brokers, causing subscribers to receive many duplicate publications while the publication loops perpetually. In addition, the loop will result in the network becoming overwhelmed by publications that cannot be removed.

Numerous prior art solutions exist for detecting and/or preventing occurrence of loops in networks. For example, Dawson et al. (U.S. Pat. No. 6,230,198) discloses a server-to-server event message generated for a received event. The server-to-server event message includes an event identifier, a text pertinent to event message, and a source trail indicating the origin and history of the event. The source trail comprises any source trail from a sending server received with the event, the identifier of the client supplying event, and an identifier of the present server. The server-to-server event message is then transmitted to the receiving server, so that the receiving server may know the origin and any subsequently transmitting servers in the distribution. The source trail of the server-to-server event message can be parsed to determine each identifier in the source trail. The server-to-server event message is transmitted to the receiving server only if the receiving server identifier is absent from the parsed source trail, thus preventing any loops, which might cause the event to be repeatedly received.

Benedict et al. (U.S. Pat. No. 5,321,812) discloses generating a loop-detection message. There is a risk that the brokers will become configured into a closed loop within which data will circulated endlessly. To eliminate this risk, a loop-detection message is generated when a broker acquires a new server broker and is itself a server broker for other brokers. The message, which includes the originating broker's name, is passed from served broker to server broker. Each broker inspects the message. If it does not find its own name, it appends its name to the message and passes it on to its own server broker. If the broker does find its own name, it generates a loop-detected message that revokes the server/served relationship with the current server broker.

However, these prior solutions require maintaining knowledge of the whole network configuration. Maintaining knowledge of whole network configuration at each broker introduces a significant overhead in large networks and breaks the concept that each broker should only be aware of directly connected brokers. In addition, topic space (i.e., a composition of a hierarchy of topics) becomes confined to the connection network.

Therefore, there is a need for a loop detection system/method which takes place during the pub/sub network configuration stage, to prevent excessive overhead during normal operation. It would be desirable to provide a loop detection system/method that enables a broker to only require knowledge of directly connected brokers, and that is capable of permitting connection loops if a topic space is appropriately configured to prevent any publications looping back to their point of origin.

SUMMARY OF THE INVENTION

The above-mentioned disadvantages or drawbacks have been eliminated by the present invention, which includes a method for detecting a loop in a publish/subscribe network, the publish/subscribe network having at least one broker, comprising:

connecting a new broker to the publish/subscribe network by creating a new connection between the new broker and a parent broker in the publish/subscribe network, the new broker from which the new connection is made, the parent broker to which the new connection is made;

creating a loop detection message at the new broker, the loop detection message comprising information representing one or more of: the new broker, the parent broker, all topics which are published at the new broker over the new connection;

sending the loop detection message from the new broker over the new connection;

upon receiving the loop detection message at a receiving broker, checking if the receiving broker is the new broker from which the loop detection message is originated;

if the receiving broker is not the new broker, removing topics in the loop detection message that cannot be propagated to a neighbor broker of the receiving broker and forwarding the loop detection message to the neighbor broker from the receiving broker;

if the receiving broker is the new broker, deciding that a loop is created by the new connection; and upon deciding that the loop is created by the new connection, canceling the new connection.

In one embodiment, the present invention provides a system for detecting a loop in a publish/subscribe network, the publish/subscribe network having at least one broker, comprising:

means for connecting a new broker to the publish/subscribe network by creating a new connection between the new broker and a parent broker in the publish/subscribe network, the new broker from which the new connection is made, the parent broker to which the new connection made;

means for creating a loop detection message at the new broker, the loop detection message comprising information representing one or more of: the new broker, the parent broker, all topics which are published at the new broker over the new connection;

means for sending the loop detection message from the new broker over the new connection;

means implemented at a receiving broker for checking if the receiving broker is the new broker from which the loop detection message is originated;

means for removing topics in the loop detection message that cannot be propagated to a neighbor broker of the receiving broker where the receiving broker is not determined as the new broker and forwarding the loop detection message to the neighbor broker from the receiving broker;

means for deciding that a loop is created by the new connection when the receiving broker is the new broker; and means for canceling the new connection when the loop is created.

In another embodiment, the present invention provides a solution that:
  a. prevents publications from entering a loop.
  b. only requires each broker of the pub/sub network to have knowledge of other directly connected brokers, not of the whole network.
  c. permits loops, if a topic space across the network prevents a publication from looping.
  d. is validated during configuration, with no additional publication overhead (in message headers or validation) during normal operation.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings,
  a.

DETAILED DESCRIPTION

The present invention sends a loop detection message, as a new broker creates a new connection in a pub/sub network. The loop detection message makes use of the topic space to build up the union of permitted topics through any given route. Therefore, if the loop detection message contains no topics, the message is not propagated further. Only if the loop detection message returns to an originating broker, a loop exists in the topic space and an appropriate action, e.g., canceling the new connection in the network, is taken. Loops can exist, if the topic space has been defined such that a publication cannot loop through those brokers that consist of the loops. The present invention only requires each broker to have knowledge of other directly connected brokers and is validated during configuration on normal operation.

Figure 1:
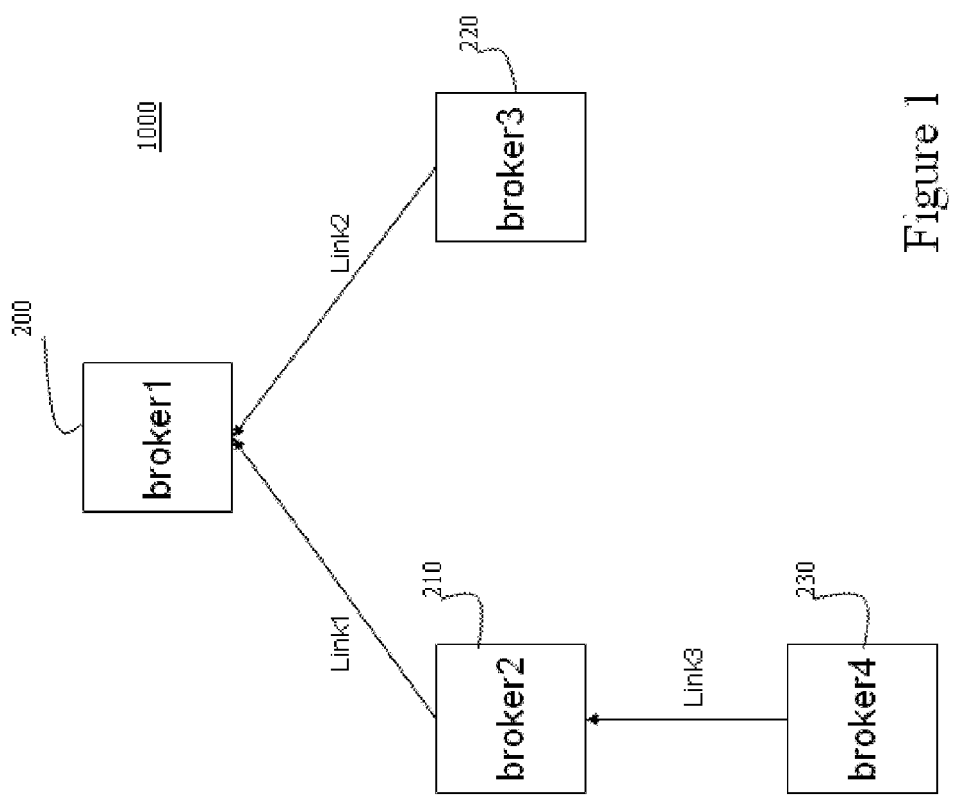
FIG. 1 depicts a pub/sub network topology where no loop exists.
  b.

FIG. 1 illustrates an example pub/sub (publish/subscribe) network comprising four brokers. In one embodiment, connections (i.e., wired or wireless communication links) between brokers are made hierarchically (as like tree structure). For example, a broker 1 (200) is a root node in the pub/sub network. Broker 2 (210) is connected to the broker 1 (200) via link 1 as an intermediate node. Broker 3 (220) is connected to the broker 1 (200) via link 2 as another intermediate node. Broker 4 (230) is connected to the broker 2 (210) via link 3 as a leaf node. It is understood that many diverse network topologies (e.g., a mesh structure, a ring structure, a star structure, a fully connected structure, a line structure, a bus structure, etc.) can be configured for this pub/sub network. The example pub/sub network 1000 illustrated in FIG. 1 does not include a loop (i.e., a closed circuit of links between brokers). Publications (e.g., communicated as messages from a publishing node) and subscriptions (e.g., communicated as messages from a subscribing node) traverse connections (e.g., link1, link 2, link 3) in either direction.

Figure 2:
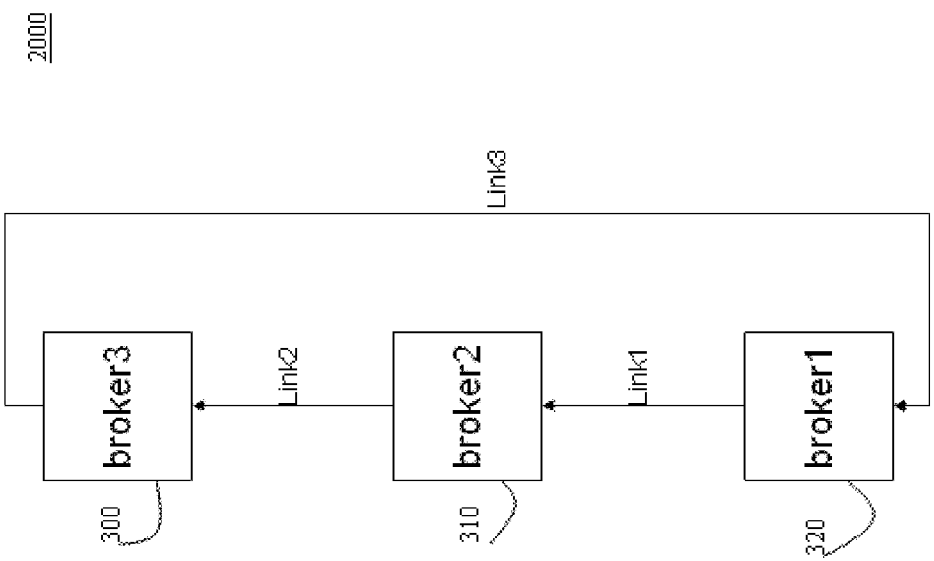
FIG. 2 depicts a pub/sub network topology where a loop exists.
  c.

FIG. 2 illustrates an existence of a loop in an example pub/sub network. The pub/sub network 2000 in FIG. 2 has hierarchical connections (i.e., Broker 3 (300) is a root node, Broker 2 (310) is an intermediate node, Broker 1 (320) is a leaf node)) and has a loop (i.e., a closed circuit of links between brokers): a link 1 between the broker 1 (320) and the broker 2 (310), a link 2 between the broker 2 (310) and the broker 3 (300), and a link 3 between the broker 3 (300) and the broker 1 (320) form a loop. Any publication entering the pub/sub network 2000 may perpetually circulate, being delivered to subscribers every time the publication arrives at each broker.

Figure 3:
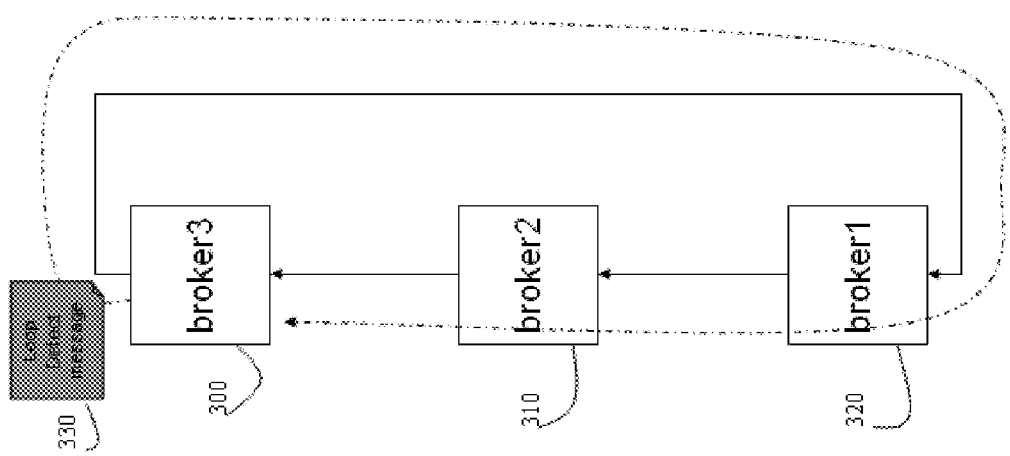
FIG. 3 depicts a loop detection message in a pub/sub network.
  d.

FIG. 3 illustrates a generation and traversal of a loop detection message 330 sent to detect a loop in the example pub/sub network. As a new link is added between a broker 3 (300) and a broker 1 (320), a defining broker (i.e., a broker from which the new link is originating; e.g., broker 3 (300)) creates and sends a loop detection message 330 to its neighbor broker (e.g., a broker 1 (320)) via a connecting link. Upon receiving the loop detection message 330, a broker (e.g., a broker 1 (320)) forwards the loop detection message 330 to its neighbor broker (e.g., a broker 2 (310)). In turn, a broker (e.g., a broker 2 (310)) that receives the loop detection message 330 forwards the loop detection message 330 to its neighbor broker (e.g., a broker 3 (300)). In one embodiment, every broker receiving the loop detection message 330 checks whether it is the defining broker from which the loop detection message is sent. In this embodiment, the loop detection message stores the defining broker information. Therefore, when the loop detection message is arrived at the defining broker (e.g., after circulating the pub/sub network), the defining broker can recognize that there is a loop in the pub/sub network.

Figure 4:
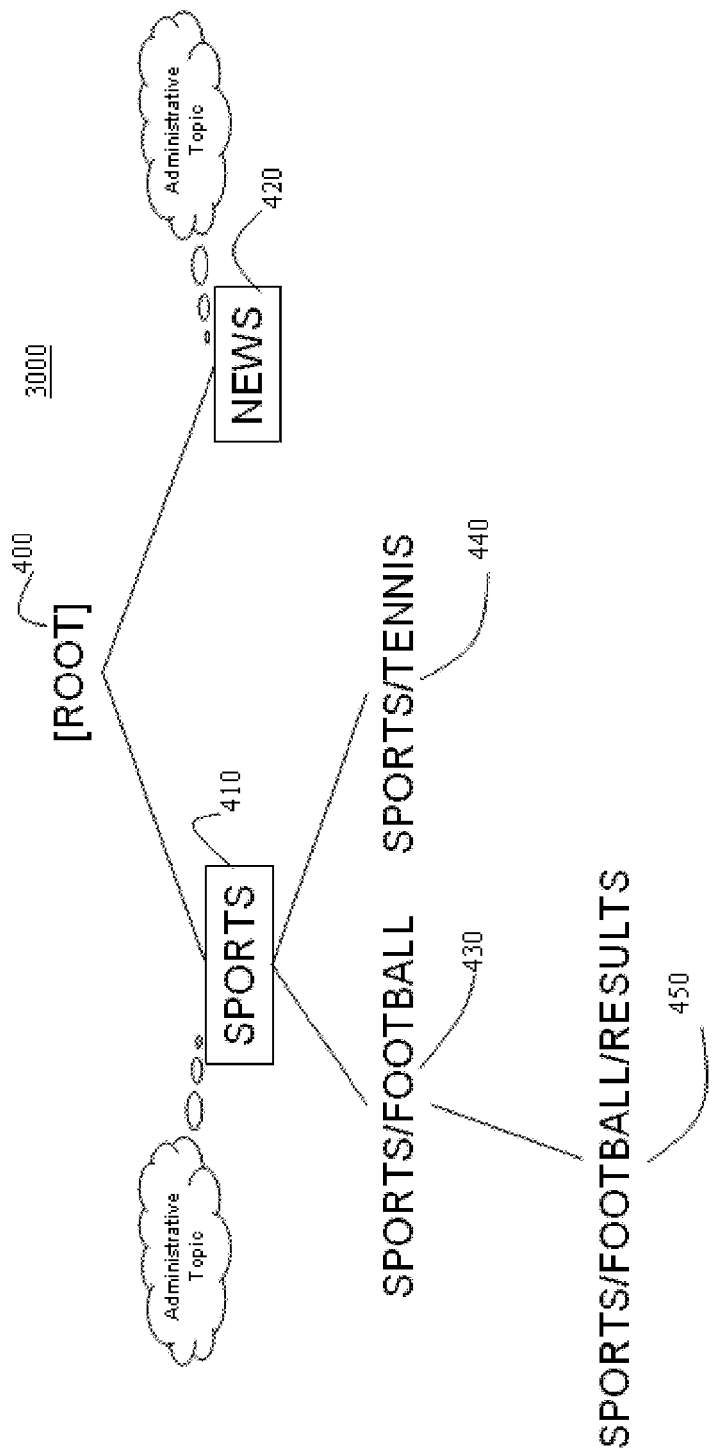
FIG. 4 depicts a topic space within a broker.
  e.

FIG. 4 illustrates a topic space within a broker. A topic space is a hierarchy of topics within a broker. In a pub/sub network, publications and subscriptions take place based on topics. In one embodiment, these topics are hierarchically structured as a tree structure as illustrated in FIG. 4. One of ordinary skilled in the art will understand other data structures (e.g., a linked list, a heap, etc.) can be used to represent a topic space. In FIG. 4, a topic space 3000 has a root node 400. Under the root node, there are topics such as SPORTS 410 and NEWS 420. A topic (e.g., SPORTS 410) can have subordinate topics such as SPORTS/FOOTBALL 430 and SPORTS/TENNIS 440. A subordinate topic (e.g., SPORTS/FOOTBALL 430) can have its subordinate topic (e.g., SPORTS/FOOTBALL/RESULTS 450). Topics are used by publishers and subscribers when publishing and subscribing messages. For example, a publisher can produce a message including a topic SPORTS 410. Any subscriber registered to topic SPORTS 410 receives a message including a topic SPORTS 410, a topic SPORTS/FOOTBALL 430, a topic SPORTS/TENNIS 440, or a topic SPORTS/FOOTBALL/RESULTS 450. In one embodiment, these topics are administratively formed and have certain properties that affect brokers, publishers, and subscribers registered to receive messages of these topics and subordinate topics of these topics. For example, one property is an ability for publications on a topic to be delivered to other brokers. For another example, in FIG. 3, if all three brokers were to define a topic SPORTS 410 as delivering publications to other brokers, publications including a topic SPORTS 410 or its subordinate topic (e.g., a topic SPORTS/FOOTBALL 430, a topic SPORTS/TENNIS 440, or a topic SPORTS/FOOTBALL/RESULTS 450) can perpetually circulate.

Figure 5:
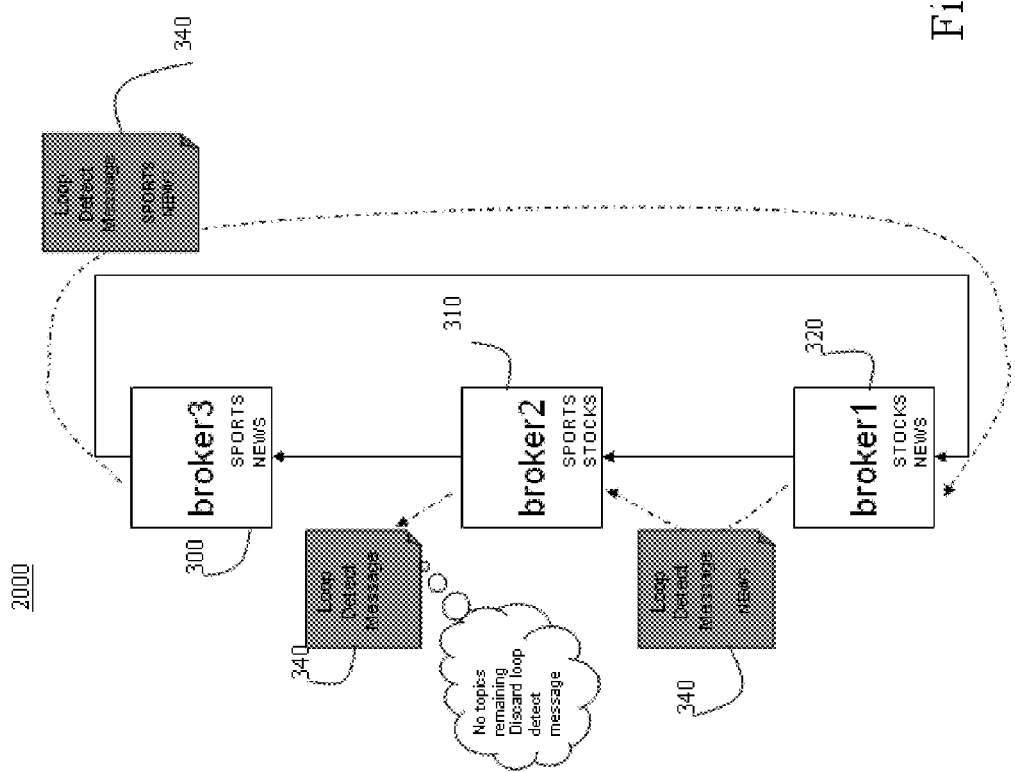
FIG. 5 depicts permitting a loop by configuring a topic space across a pub/sub network.
  f.

FIG. 5 illustrates allowing a loop in the example pub/sub network by configuring a topic space at each broker. In FIG. 5, a broker 3 (300), a broker 2 (310), and a broker 1 (320) are connected in a loop. However, topic spaces at brokers are configured so that there is no topic that allows a publication to circulate in the pub/sub network 2000. In FIG. 5, after establishing a new connection from a broker 3 (300) to a broker 1 (320), a defining broker (e.g., a broker 3 (300)) creates and sends a loop detection message 340 including a topic SPORTS and NEWS to its neighbor broker (e.g., a broker 1 (320)). In one embodiment, a loop detection message at the defining broker (i.e., an originating broker from which a new connection is made) stores all topics that can be published over the new connection. For example, a broker 3 (300) that is a defining broker is registered to topics SPORTS and NEWS. Therefore, a loop detection message 340 that is created at the broker 3 (300) stores topics SPORTS and NEWS. Upon receiving the loop detection message 340, a broker receiving the loop detection message (e.g., a broker 1 (320)) compares its topic space (e.g., STOCKS and NEWS) and topics in the loop detection message 340 (SPORTS and NEWS). The receiving broker (e.g., a broker 1 (320)) removes unregistered topics (e.g., SPORTS) in the loop detection message 340. In one embodiment, the receiving broker (e.g., a broker 1 (320)) checks whether there is a topic remaining in the loop detection message, after removing the unregistered topics in the loop detection message. If a topic is remained in the loop detection message, then the receiving broker (e.g., a broker 1 (320)) forwards the loop detection message 340 to its neighbor broker (e.g., a broker 2 (310)). If a topic is not remained in the loop detection message, the receiving broker (e.g., a broker 1 (320)) discards the loop detection message 340. In this embodiment, at the defining broker (e.g., a broker 3 (340)), if a loop detection message that is sent from the defining broker is not returned to the defining broker within a pre-determined period, it is determined that a new connection created by the defining broker does not create a loop. For example, upon receiving the loop detection message 340, a broker receiving the loop detection message (e.g., a broker 2 (310)) compares its topic space (e.g., SPORTS and STOCKS) and topics in the loop detection message 340 (NEWS). The receiving broker (e.g., a broker 2 (310)) removes unregistered topics (e.g., NEWS) in the loop detection message 340. After removing the unregistered topics in the loop detection message, the receiving broker (e.g., a broker 2 (310)) checks whether a topic is remained in the loop detection message 340. If there is no topic remained in the loop detection message 340 (e.g., there is no topic remained in the loop detection message 340 after removing a topic NEWS), the loop detection message 340 is discarded at the receiving broker (e.g., a broker 2 (310)).

Figure 6:
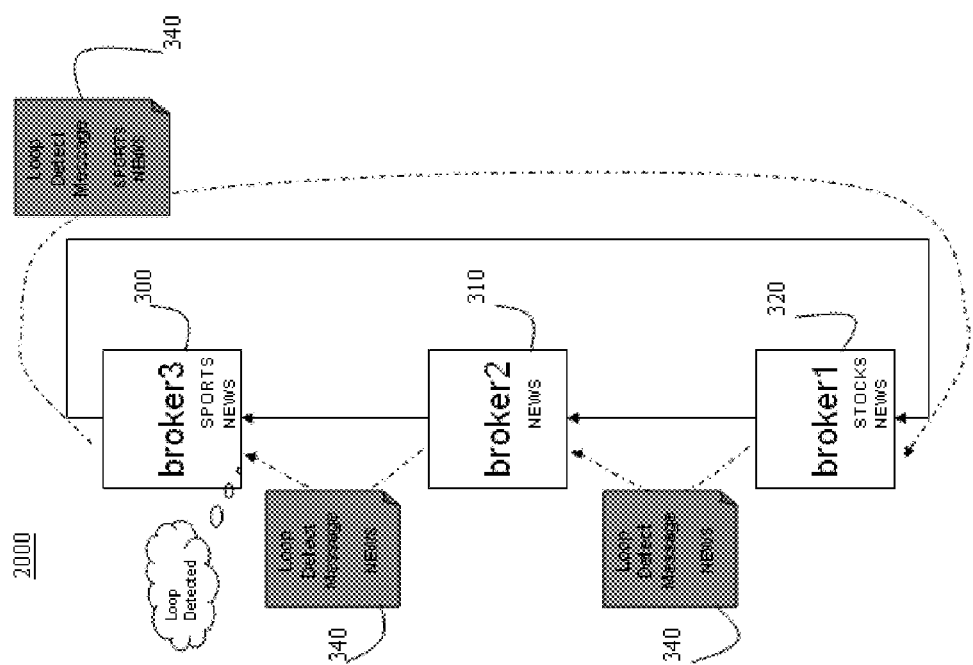
FIG. 6 depicts detecting a loop by a loop detection message.
  g.

FIG. 6 illustrates detecting a loop in a pub/sub network by a loop detection message. In FIG. 6, a broker 3 (300), a broker 2 (310), and a broker 1 (320) are connected in a loop. Topic spaces at each broker in FIG. 6 are configured so that there is at least one topic that allows a publication to circulate in the pub/sub network 2000. In FIG. 6, after establishing a new connection from a broker 3 (300) to a broker 1 (320), a defining broker (e.g., a broker 3 (300)) creates and sends a loop detection message 340 including a topic SPORTS and NEWS to its neighbor broker (e.g., a broker 1 (320)). Upon receiving the loop detection message 340, a broker receiving the loop detection message (e.g., a broker 1 (320)) compares its topic space (e.g., STOCKS and NEWS) and topics in the loop detection message 340 (SPORTS and NEWS). Then, the receiving broker (e.g., a broker 1 (320)) removes the unregistered topics (e.g., SPORTS) in the loop detection message 340. After removing the unregistered topics, the receiving broker (e.g., a broker 1 (320)) checks whether there is a topic remained in the loop detection message 340. If at least one topic is remained in the loop detection message 340, the receiving broker (e.g., a broker 1 (320)) forwards the loop detection message to its neighbor broker (e.g., a broker 2 (310)). Upon receiving the loop detection message 340, a broker receiving the loop detection message (e.g., a broker 2 (310)) compares its topic space (e.g., NEWS) and topics in the loop detection message 340 (NEWS) and removes unregistered topics at the receiving broker (e.g., a broker 2 (310)). If there are no unregistered topics in the loop detection message 340, no topic in the loop detection message 340 is removed. Then, the receiving broker (e.g., a broker 2 (310)) checks whether a topic (e.g., NEWS) is remained in the loop detection message 340. If a topic is remained in the loop detection message 340, the loop detection message 340 is forwarded to its neighbor broker (e.g., a broker 3 (300)). As stated before, every broker receiving the loop detection message 340 checks whether it is the defining broker from which the loop detection message is sent. The loop detection message stores the defining broker information. Upon receiving the loop detection message 340, if the receiving broker (e.g., a broker 3 (300)) recognizes that the receiving broker (e.g., a broker 3 (300)) is the defining broker in the loop detection message 340, the receiving broker determines that a loop exists in the pub/sub network.

Figure 7:
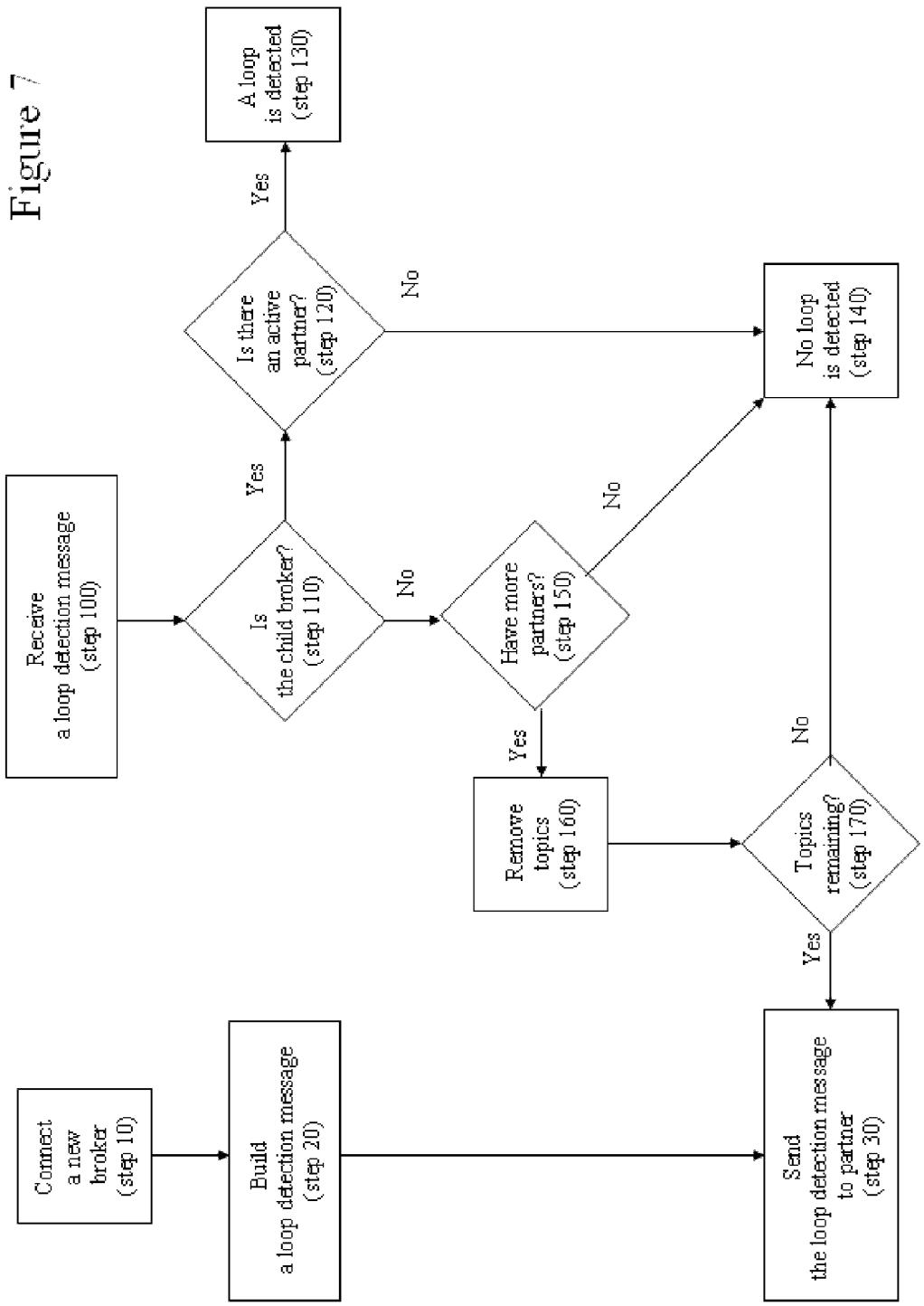
FIG. 7 depicts a flow chart that the present invention employs.

FIG. 7 illustrates a flow chart depicting a loop detection methodology of the present invention. At step 10, a new broker is connected to the pub/sub network. At step 20, a loop detection message is created at the new broker. The loop detection message includes information or data representing the new broker (an originator) from which a new connection is being made and from which the loop detection message is sent, a parent broker to which the new connection is being made, and all topics that may be published over the new connection. At step 30, the loop detection message is sent over the new connection created by the new broker. At step 100, the loop detection message is received at a broker. Initially, the loop detection message is forwarded from the new broker to the parent broker that is specified in the loop detection message. At step 110, the receiving broker checks if the receiving broker is the new broker, from which the loop detection message is sent. If the receiving broker is the new broker, step 120 checks if a partner (i.e., a neighbor broker in the network) of the receiving broker is active. If a partner of the receiving broker is active, step 130 decides there is a loop in the network. If there is no active partner at step 120, step 140 decides there is no loop. If it is determined, at step 110, that the receiving broker is not the new broker, which is specified in the loop detection message, it is checked at step 150 if the receiving broker has partners. If it is determined, at step 150, that the receiving broker has no partner, then no loop is detected. However, if it is determined at step 150 that the receiving broker has partners, step 160 removes any topics in the loop detection message that can not be published onwards. After removing topics, step 170 checks if a topic is remaining in the loop detection message. If step 170 determines there is no topic remaining, step 140 determines there is no loop in the network. If step 170 determines there is topic(s) remaining, the loop detection message is forwarded to a partner of the receiving broker.

In one embodiment, in an environment whereby a broker can be configured not to publish to a certain topic, as a new broker attaches itself to a network, the new broker sends a loop detection message to a first neighbor broker. The loop detection message comprises a topic (or topics) to which the loop detection message can be published. The first neighbor broker forwards the message to its neighbor broker, if the first neighbor broker can publish messages associated with a certain subset of the topics within the message, preferably removing any topics that are not allowed by the first neighbor broker. If the loop detection message is received back by the new broker, a loop is detected. If the loop detection message is not received back by the new broker (e.g. because the first neighbor broker has not passed the loop detection message to a partner (i.e., a neighbor broker in the network) in the loop as it has been configured not to publish the loop detection messages associated with a certain subset of the topic), a loop, which is not detected, is permitted as result. Therefore, loops such as a loop for reducing hop distance between any two brokers in the network can be permitted by topic space configuration at each broker. As a loop detection message is not sent to all partners, each broker of the pub/sub network has only knowledge of directly connected brokers. Each broker does not need to have the knowledge of all network connections in the pub/sub network.

In one embodiment, the loop detection message includes information or data representing a new broker from which a newly formed connection is made and a parent broker to which the newly formed connection is made. After receiving the loop detection message, a broker that received the loop detection message checks if it is the new broker of a newly formed connection and if it is directly connected to the parent broker. If the broker is not the new broker of the newly formed connection, it forwards the loop detection message to its neighbor broker. If the broker is the new broker of the newly formed connection, a loop is detected and an appropriate action such as canceling the newly formed connection will be taken.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form, Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing

The invention claimed is:

1. A method for detecting a loop in a publish/subscribe network, the publish/subscribe network having at least one broker, comprising:
   connecting a new broker to the publish/subscribe network by creating a first new connection between the new broker and a parent broker and a second new connection between the new broker and a neighbor broker of the new broker in the publish/subscribe network, the new broker from which the first new connection is made, the parent broker to which the first new connection is made;
   creating a loop detection message at the new broker, the loop detection message comprising information representing the new broker, the parent broker, all topics which are published at the new broker over the new connections;
   sending the loop detection message from the new broker to the parent broker over the first new connection or to the neighbor broker of the new broker over the second new connection, the parent broker or the neighbor broker of the new broker forwarding the loop detection message to a receiving broker of the publish/subscribe network;
   upon receiving the loop detection message at the receiving broker, checking if the receiving broker is the new broker from which the loop detection message is originated;
   if the receiving broker is not the new broker, removing topics in the loop detection message, the removed topics that are not registered to a neighbor broker of the receiving broker, and forwarding the loop detection message having the removed topics that are not registered to the neighbor broker of the receiving broker, to the neighbor broker of the receiving broker; repeating the checking, the removing, and forwarding the loop detection message having the removed topics until no topics remain in the loop detection message if the receiving broker is not determined as the new broker;
   if the receiving broker is the new broker, deciding that a loop is created by the new connections; and
   upon deciding that the loop is created by the new connections, canceling the new connections in order to prevent publications from entering the loop.

2. The method of claim 1, further comprising:
   at the receiving broker, determining whether there is an active neighbor broker or not.

3. The method of claim 1, further comprising:
   upon receiving the loop detection message at the neighbor broker, performing said checking, said removing, said forwarding, and said deciding at the neighbor broker.

4. The method of claim 1, further comprising:
   upon receiving the loop detection message at a receiving broker, determining if the receiving broker is the new broker and if the receiving broker is directly connected to the parent broker of the new broker.

5. The method of claim 1, wherein each broker in said network has knowledge of directly connected brokers, without knowledge of all network connections in the network.

6. The method of claim 1, wherein a loop is permitted by configuring topic spaces at each broker in the network.

7. The method of claim 1, further comprising:
   if there is no topic remaining in the loop detection message after said removing, determining that there is no loop in the publisher/subscriber network.

8. The method of claim 7, further comprising:
   preventing further propagation of said loop detection message, if there is no topic in said loop detection message.

9. A system for detecting a loop in a publish/subscribe network, the publish/subscribe network having at least one broker, comprising:
   a memory device;
   a processor device connected to the memory device,
   wherein the processor device is configured to:
   connect a new broker to the publish/subscribe network by creating a first new connection between the new broker and a parent broker and a second new connection between the new broker and a neighbor broker of the new broker in the publish/subscribe network, the new broker from which the first new connection is made, the parent broker to which the first new connection is made;
   create a loop detection message at the new broker, the loop detection message comprising information representing the new broker, the parent broker, all topics which are published at the new broker over the new connections;
   send the loop detection message from the new broker to the parent broker over the first new connection or to the neighbor broker of the new broker over the second new connection, the parent broker or the neighbor broker of the new broker forwarding the loop detection message to a receiving broker;
   check if the receiving broker is the new broker from which the loop detection message is originated;
   remove topics in the loop detection message, the removed topics that are not registered to a neighbor broker of the receiving broker when the receiving broker is not determined as the new broker;
   forward the loop detection message having the removed topics that cannot be propagated are not registered to the neighbor broker, to the neighbor broker from the receiving broker;
   repeat the checking, the removing and forwarding the loop detection message having the removed topics until no topics remain in the loop detection message if the receiving broker is not determined as the new broker;
   decide that a loop is created by the new connections when the receiving broker is the new broker; and
   cancel the new connections when the loop is created in order to prevent publications from entering the loop.

10. The system of claim 9, wherein the processor device is further configured to:
    determine whether there is an active neighbor broker or not.

11. The system of claim 9, wherein the neighbor broker receiving the loop detection message is configured to:
    check if the receiving broker is the new broker from which the loop detection message is originated;
    remove topics in the loop detection message;
    forward the loop detection message having the removed topics that are not registered to the neighbor broker, to the neighbor broker from the receiving broker; and
    decide that a loop is created by the new connections when the receiving broker is the new broker.

12. The system of claim 9, wherein the processor device is further configured to:
    determine whether the receiving broker is the new broker and whether the receiving broker is directly connected to the parent broker of the new broker.

13. The system of claim 9, wherein each broker in said network has knowledge of directly connected brokers, without knowledge of all network connections in the network.

14. The system of claim 9, wherein a loop is permitted by configuring topic spaces at each broker in the network.

15. The system of claim 9, wherein the processor device is further configured to:

determine whether there is no topic remaining in the loop detection message after said removing, wherein no loop exists in the publisher/subscriber network, if no topic is remaining.

16. The system of claim 15, wherein the processor device is further configured to:

prevent further propagation of said loop detection message when there is no topic in said loop detection message.

17. A program storage device readable by machine, tangibly embodying a program of instructions executable by the machine to perform method steps for detecting a loop in a publish/subscribe network, said method steps comprising the steps of claim 1.

18. A non-transitory computer usable medium having computer readable program code means embodied therein for detecting a loop in a publish/subscribe network, the computer readable program code means in said computer program product comprising computer readable program code means for causing a computer to effect the functions of claim 1.

\* \* \* \* \*